United States Patent [19]

Ozawa

[11] Patent Number: 5,002,396
[45] Date of Patent: Mar. 26, 1991

[54] DISPLACEMENT TELEMETERING SYSTEM

[75] Inventor: Tamane Ozawa, Yokohama, Japan

[73] Assignee: Kabushiki Kaisha Toshiba, Kawasaki, Japan

[21] Appl. No.: 176,375

[22] Filed: Mar. 31, 1988

[30] Foreign Application Priority Data

Jan. 5, 1988 [JP] Japan ................................ 63-140

[51] Int. Cl.⁵ .......................................... G01B 11/24
[52] U.S. Cl. .................................................. 356/375
[58] Field of Search ............................... 356/153, 375

[56] References Cited

U.S. PATENT DOCUMENTS 4,457,625 7/1984 Greenleaf et al. .................. 356/360

OTHER PUBLICATIONS

Collyer et al., "Electro-Optical System for Remote Position Measurements in Real Time," Large Space Systems Technology-1981, Third Annual Technical Review, Nov. 16-19, 1981, pp. 642-655.
Schock et al., "MSFC Data Analysis of the SAFE/-DAE Experiment," Large Space Antenna Systems Technology-1984, Dec. 4-6, 1984; pp. 505-516.

Primary Examiner—Richard A. Rosenberger
Attorney, Agent, or Firm—Foley & Lardner, Schwartz, Jeffery, Schwaab, Mack, Blumenthal & Evans

[57] ABSTRACT

A displacement telemetering system comprises a light source for emitting a light beam, a reflector whose reflecting direction is variable to receive and reflect the light beam of the light source, a plurality of reflecting members disposed on an object to be measured to receive the light beam reflected by the reflector and to reflect the light beam in a direction antiparallel to the incident light beam, and an optical position detector for detecting the parallel displacement of a reflected light beam from one of the reflecting members with respect to an incident light beam to the same reflecting member.

A light beam of the light source is made incident onto one of the reflecting members on the object via the reflector. The reflecting member reflects the incident light beam in a direction antiparallel to the incident light beam. The reflected light beam is made incident onto the optical position detector via the reflector. The detector detects a parallel displacement of the reflected light beam of the reflecting member with respect to the incident light beam to the reflecting member. Then, according to the parallel displacement of light beam, the displacement position of the object is measured to determine the displacement amount of the object.

17 Claims, 9 Drawing Sheets

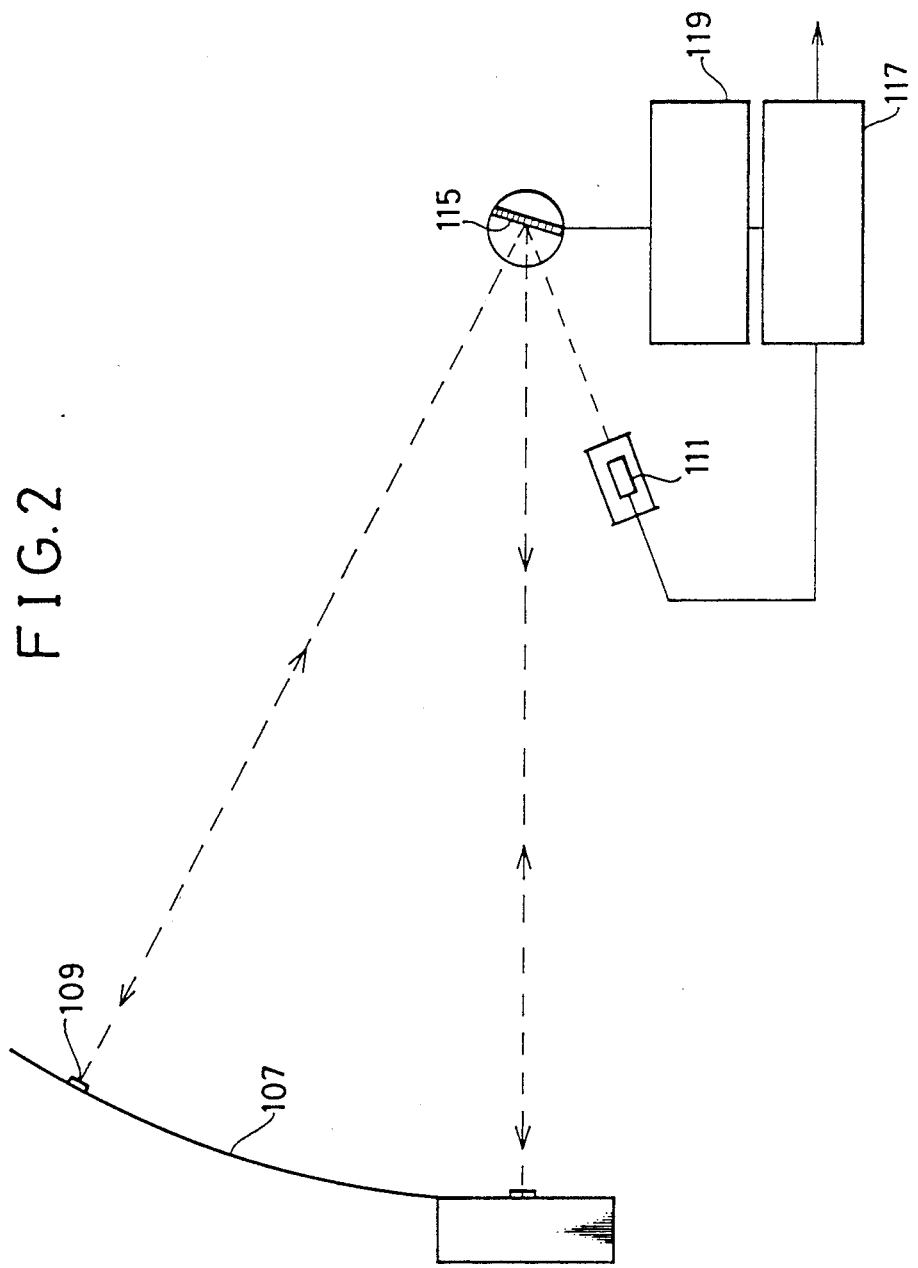

DISPLACEMENT TELEMETERING SYSTEM

BACKGROUND OF THE INVENTION

1. Field of the Invention

The present invention relates to a displacement telemetering system for accurately measuring displacements such as construction error, heat strains and vibrations of an object such as a space antenna reflector.

2. Description of the Prior Art

FIG. 1 shows an example of a space antenna used for communications, broadcasting, observation, etc. The antenna comprises a transmission horn 101 acting as a primary radiator, a sub-reflector 103 for reflecting radio waves transmitted from the transmission horn 101, and a main reflector 105 for reflecting the radio waves reflected by the sub-reflector 103 in a particular direction. The space antenna is a huge structure, and a mirror surface of the main reflector 105 is required to be highly accurate.

To install such an antenna in space, the antenna is folded into a proper size or divided into segments to reduce its size. After launched into the space, the antenna is developed or assembled back to its original shape.

Since the surface of the antenna should be highly accurate, surface accuracy of the reflector 105, etc., should be correctly measured after they are assembled in space, and heat strains caused on the reflector, etc., due to severe temperature changes should also be measured.

FIG. 2 and 3 show conventional displacement telemetering system respectively, for measuring the displacements and vibrations of a remote object.

The system shown in FIG. 2 is provided with a reflecting member 109 arranged on an antenna reflector 107 which is to be measured Light emitted from a light source 11 is intensity-modulated and made incident onto the reflecting member 109 through a scanning mirror 115. The return time of the light made incident onto the reflecting member 109 is measured, and the deformation amount of the reflector 107 is calculated in a displacement operating portion 117. A mirror driving unit 119 changes the inclination angle of the scanning mirror 115 to make light incident onto another reflecting member 109 on the reflector 107 to measure the deformation amount of another measuring point of the reflector 107.

However, in this system the measuring accuracy depends upon an optical range finding system which is based on intensity modulation, so a satisfactory accuracy is not obtainable.

Another conventional telemetering system shown in FIG. comprises an object 120 to be measured, an LED 121 as a light source, and a lens system 123 which receives light emitted from the LED 121 to provide a light beam. The beam is divided by a dividing mirror 125 into two component beams which are orthogonal to the optical axis of the incident beam. The divided component beams are focused onto optical sensors 129a and 129b through lenses 127a and 27b, respectively. Then, the deformation amount of the object 120 is measured by a light spot position sensor In this system, the LED 121 as a light source is disposed on the object 120 to be measured, so wiring will need to be provided for the object 120. Further, if the energy source for the LED 121 is consumed, it will be difficult to measure the displacement of the object 120 because the energy source of the LED is difficult to recharge due to the remoteness of the object 120. In addition, if the number of measuring points of the object 120 is increased, the substantially same number of optical systems, each comprising the lens system 123, dividing mirror 125, lenses 127a and 127b and optical sensors 129a and 129b, should be provided, so the system becomes complicated and the number of parts is increased.

Referring to FIG. 4, there is shown a prior art system for detecting a configuration of an arrangement of a solar array 131. In this system, a star sensor 135 is constructed to detect a reflected light from corner cube reflectors 133 attached to the solar array 131 to measure the positions of the reflectors 133. However, since the star sensor 135 is designed to have a wide geometric field to detect a direction of the system facing to the star, it is impossible to measure displacements of the reflectors 133.

As described in the above, it is difficult to accurately measure the displacement of an object with the conventional telemetering systems which are based on intensity modulation.

In addition, to disposed a light source on an object to be measured, wiring would need to be arranged on the object. Once the energy source of a light source disposed on the object is consumed, it becomes impossible to measure the displacement of the object which is remotely located. If the positional displacement of the light source is measured by the light spot position sensor to determine the displacement of the object, the measurement accuracy is still not satisfactory under the wide geometric field, and optical systems would need to be prepared in the substantially same number as that of measuring points of the object, so the system will become complicated as the number of parts is increased.

SUMMARY OF THE INVENTION

One object of the present invention is to provide a displacement telemetering system which can overcome the above-mentioned problems of the prior art systems and accurately measure the displacement, etc., of a remote object.

Another object of the present invention is to provide a displacement telemetering system which can accurately measure the displacement, etc., of a remote object with a simple structure without having to dispose a light source on the object to be measured.

According to one aspect of the present invention, there is provided a displacement telemetering system which comprises a light source for emitting a light beam, a reflector whose reflecting direction is variable to receive and reflect the light beam from the light source, a plurality of reflecting members disposed on an object to be measured to receive the light beam reflected by the reflector and reflect the light beam in a direction anti parallel to the incident light beam, and an optical position detecting means for detecting the parallel displacement of a reflected light beam from one of the reflecting members with respect to the incident light beam to the reflecting member.

In this aspect, a light beam emitted from the light source is made incident onto one of the reflecting members on the object to be measured via the reflector whose reflecting direction is variable. The reflecting member reflects the incident light beam in a direction antiparallel to the incident light beam. The reflected light beam is made incident to the optical position detecting means via the reflector. The optical position detecting means detects any parallel displacement of the reflected light beam from the reflecting member with respect to the incident light beam to the reflecting member. Then, according to the parallel displacement, the displaced position of the object is measured to determine the amount of displacement of the object.

According to another aspect of the present invention, there is provided a displacement telemetering system which comprises a light source for emitting a light beam, a reflecting direction variable reflector for receiving and reflecting the light beam from the light source, a plurality of reflectors for receiving and reflecting the light beam from the reflecting direction variable reflector, a plurality of reflecting members arranged on an object to be measured to receive the light beam reflected by the reflectors and reflect the same beam back in a direction antiparallel to the incident light beam, and an optical position detecting means for detecting the parallel displacement of a reflected light beam from one of the reflecting members with respect to an incident light beam to the reflecting member. The reflectors and reflecting members are arranged such that the direction of an incident light beam to the reflecting member is substantially at right angles to a normal of the surface of the object to be measured.

In this aspect of the present invention, a light beam emitted from the light source is made incident, via the variable reflector and one of the reflectors, onto one of the reflecting members substantially at right angles to a normal of the surface of the object to be measured. The reflecting member reflects the incident light beam in a direction antiparallel to the incident light beam, and the reflected light beam is made incident to the optical position detecting means via the variable reflector and the reflector. The optical position detecting means detects the parallel displacement of the reflected light beam from the reflecting member with respect to the incident light beam to the reflecting member. According to the parallel displacement, the displacement amount of the object is measured.

These and other objects, features and advantages of the present invention will become more apparent from the following descriptions of preferred embodiments taken in conjunction with the accompanying drawings.

BRIEF DESCRIPTION OF THE DRAWINGS

FIG. 2 is a schematic explanatory view showing a displacement telemetering system according to prior art;

DETAILED DESCRIPTION OF THE PREFERRED EMBODIMENTS

Figure 1:
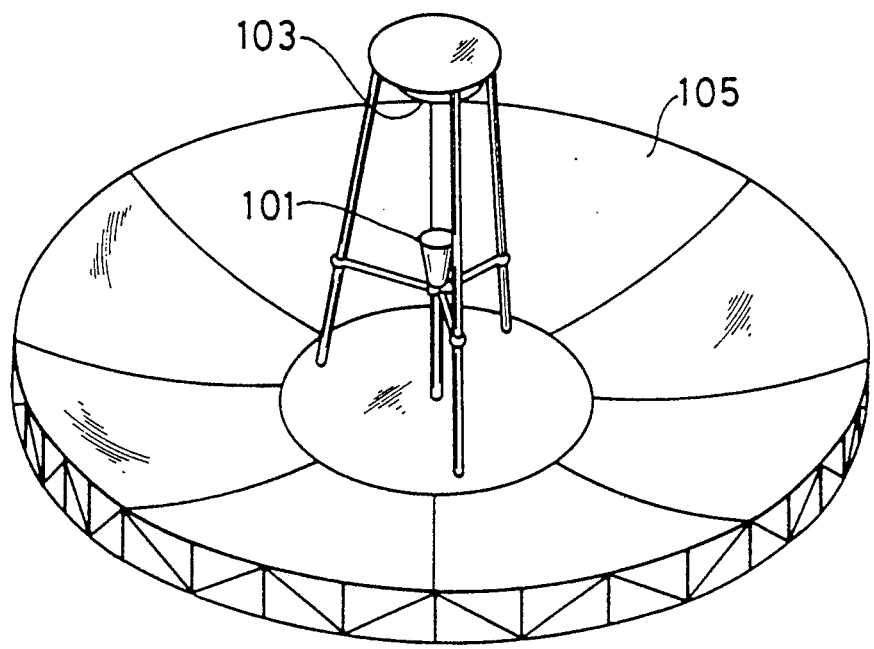
FIG. 1 is a perspective view showing an example of a space antenna.
Figure 3:
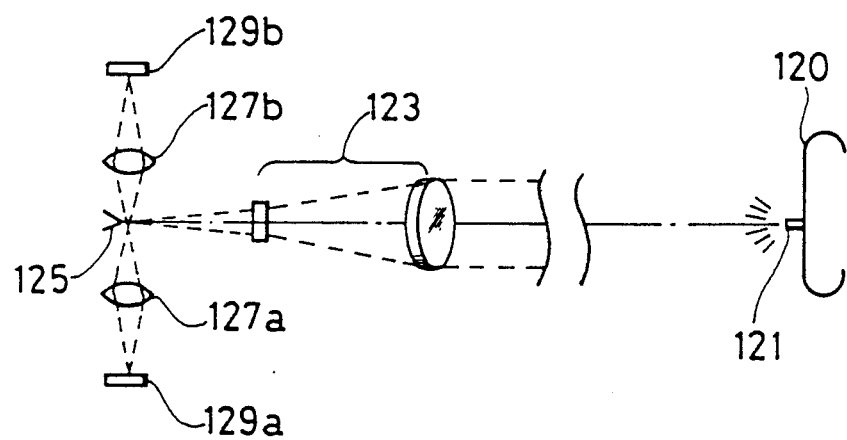
FIG. 3 is a schematic explanatory view showing another prior art system.
Figure 4:
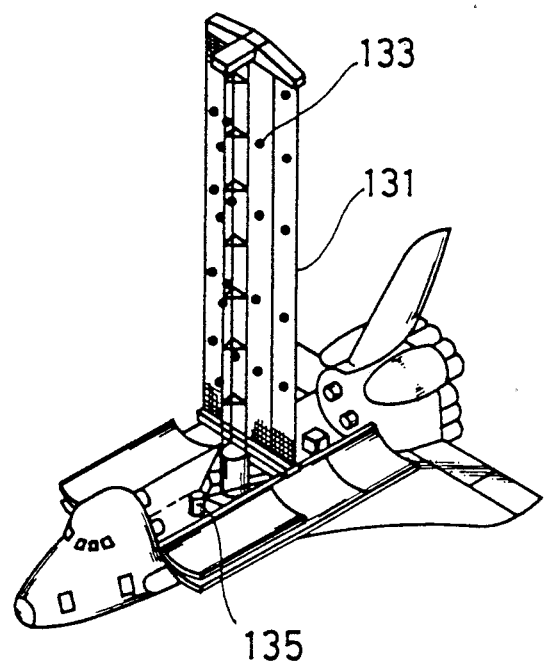
FIG. 4 is a squint view showing the other prior art system.
Figure 5:
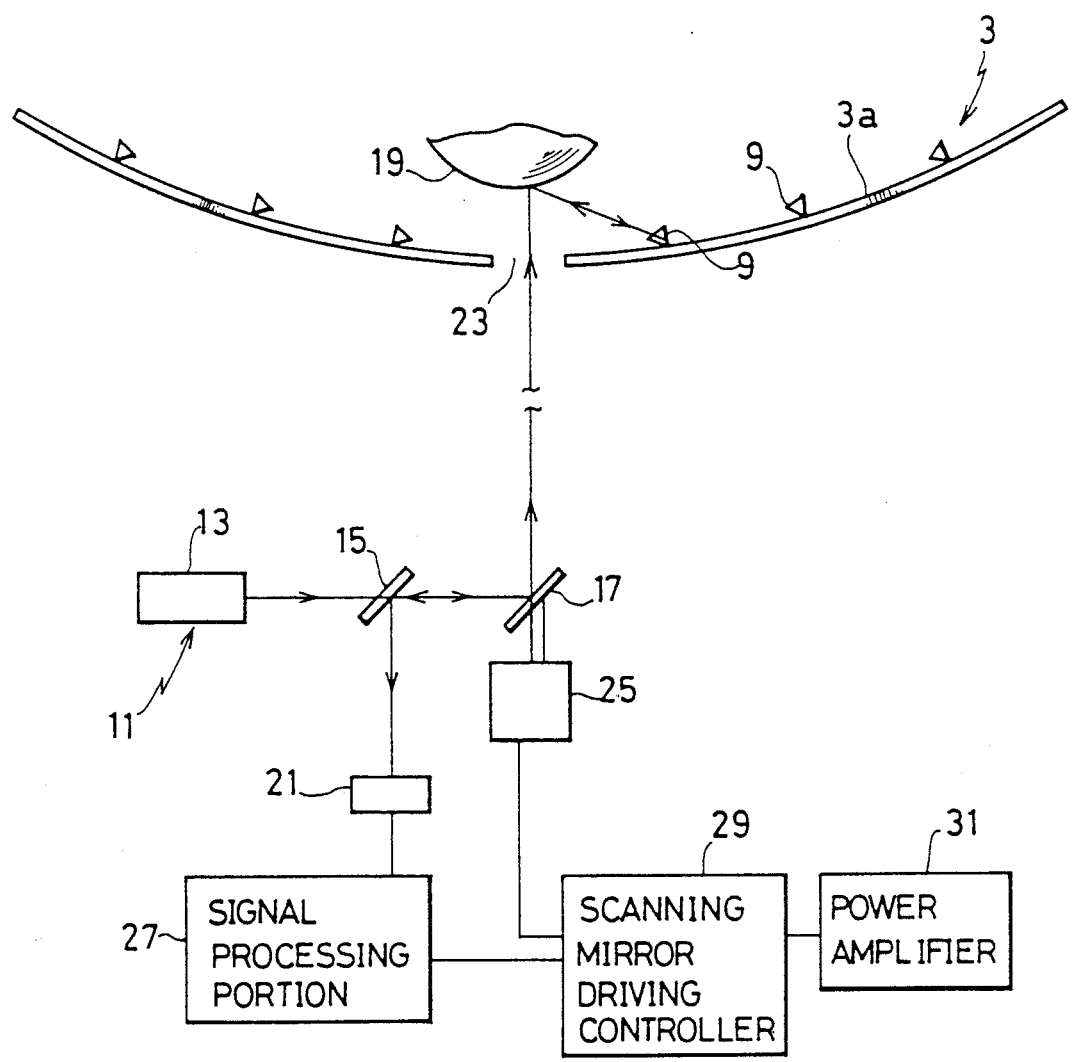
FIG. 5 is a general view showing a displacement telemetering system according to a first embodiment of the present invention embodied in a space antenna.
Figure 6:
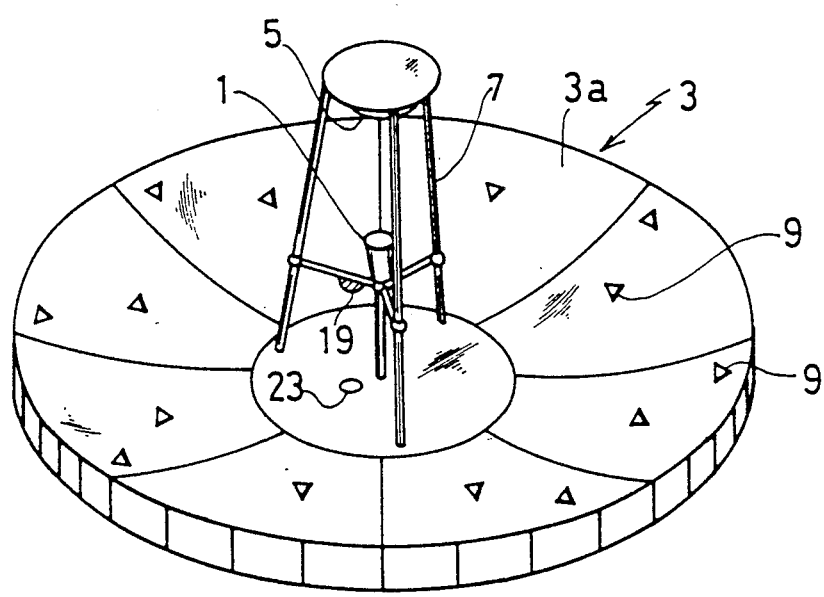
FIG. 6 is a perspective view showing the space antenna shown in FIG. 5.

FIG. 5 is a general view showing the first embodiment of a displacement telemetering system according to the present invention embodied in a space antenna, and FIG. 6 is a perspective view showing the apace antenna of the displacement telemetering system shown in FIG. 5.

As shown in FIG. 6, the space antenna comprises a transmission horn 1 as a primary radiator, a subreflector 5 for reflecting radio waves radiated from the transmission horn 1 toward a main reflector 3, and the main reflector 3 for reflecting the radio waves from the subreflector 5 in a predetermined direction. The subreflector 5 is supported by a supporting member 7.

In FIGS. 5 and 6, corner cube reflectors 9 as reflecting members are fixed with adhesives, etc., to a surface 3a of the main reflector 3 to be measured. The corner cube reflectors 9 are measuring points, and a large number of the corner cube reflectors are disposed at optional positions on the main reflector 3, each to reflect an incident light beam in a direction parallel to the incident light beam.

A measuring portion 11 comprises a light source 13 for emitting a light beam, a half mirror 15, a scanning mirror 17 as a reflecting direction variable reflector whose inclination angle is variable, a plurality of reflector 19 for forming a mirror ball having a variable reflecting direction, and a two-dimensional optical position sensor 21 as the optical position detecting means.

In this embodiment, the two-dimensional optical position sensor 21 comprises CCDs.

The half mirror 15 is inclined by 45° with respect to the emitting direction of the light beam from the light source 13. The two-dimensional optical position sensor 21 has its incident plane orthogonal to the reflected light beam.

The two-dimensional optical position sensor 21 is connected to a signal processing portion 27. The signal processing portion 27 is the displacement amount detecting means to convert signals detected by the two-dimensional optical position sensor 21 into displacement quantities along predefined X and Y directions. Also, the signal processing portion 27 carries out a predetermined process according to the incident angle of the light beam with respect to the corner cube reflector 9 and according to factors related to a shape of the main reflector 3, and outputs the result of the operation as a displacement amount of the main reflector 3.

In this embodiment, the signal processing portion 27 comprises a ROM, a RAM and a CPU. According to a program stored in the ROM, the CPU carries out the operation process for determining the displacement amount of the main reflector 3.

The scanning mirror 17 has the same optical axis as that of the half mirror 15, and its inclination angle is variable. The scanning mirror 17 is disposed at a position corresponding to a through hole 23 formed in the center of the main reflector 3. The inclination angle of the scanning mirror 17 can be adjusted by driving a scanning mirror driving device 25.

The scanning mirror driving device 25 is connected to a scanning mirror driving controller 29 and a power amplifier 31. The scanning mirror driving controller 29 changes the inclination angle of the scanning mirror 17 to correspond to a measuring point, and outputs a driving signal to the scanning mirror driving device 25 via the power amplifier 31. Further, the scanning mirror driving controller 29 transmits information on the measuring point to the signal processing portion 27 for processing the information.

The reflector 19 is disposed above the main reflector at a position corresponding to the through hole 23 of the main reflector 3 and fitted to the supporting member 7.

The scanning mirror driving device 25, which can be a magnetic floating type positioner (a non-contact type positioner), changes the inclination angle of the scanning mirror 17 accurately and reliably.

The operation of the above-mentioned system will be described.

A light beam emitted from the light source 13 passes through the half mirror 15 and is made incident onto the scanning mirror 17. The scanning mirror 17 is driven by the scanning mirror driving device 25 and positioned at a predetermined inclination angle such that the light beam made incident onto the scanning mirror 17 is reflected in a set direction and made incident onto the reflectors 19 whose reflecting direction is variable. The light beam made incident onto the reflectors 19 is reflected by the same and made incident onto a corresponding corner cube reflector 9 on the main reflector 3. The light beam made incident onto the corner cube reflector 9 is reflected in a direction antiparallel to the incident light beam toward the reflectors 19.

The light beam reflected by the corner cube reflector is reflected by the reflectors 19 and scanning mirror 17 and made incident onto the half mirror 15. The light beam is reflected by the half mirror 15 and made incident onto the two-dimensional optical position sensor 21. According to the signal detected by the two-dimensional optical position sensor 21, the signal processing portion 27 carries out an operation process to output the displacement amount of the main reflector 3.

Figure 7:
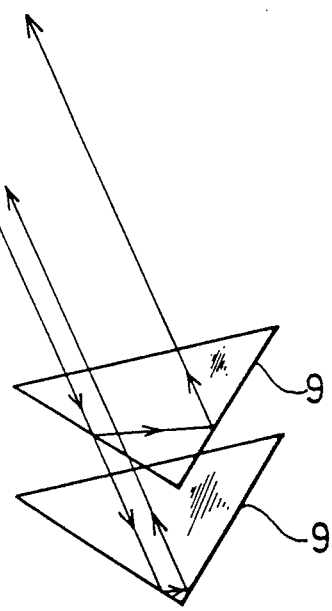
FIG. 7 is an explanatory view showing a reflecting state of a corner cube reflector of the system shown in FIG. 5.

The position of the reflected light beam made incident onto the two-dimensional optical position sensor 21 changes depending on the position of the corner cube reflector 9. Namely, the scanning mirror 17 is positioned at a fixed inclination angle with respect to one corner cube reflector 9 (one measuring point) by the scanning mirror driving device 25, which is driven and controlled by the scanning mirror driving controller 29, such that the corner cube reflector 9 (measuring point) receives a light beam at the same angle and position. Therefore, if the position of one corner cube reflector 9 is changed from an upper position to a lower position, due to heat strain, etc., of the main reflector 3 as shown in FIG. 7, the position of the reflected light beam detected by the two-dimensional optical position sensor 21 changes Then, the signal processing portion 27 carries out a predetermined process, according to the incident angle of the light beam to the corner cube reflector 9 and according to factors related to a shape of the main reflector 3, to obtain the displacement amount of the main reflector 3.

By making a light beam incident onto another corner cube reflector 9 by changing the inclination angle of the scanning mirror 17, the displacement amount of the main reflector 3 at a different position can be determined.

In this way, without providing a light source on an object to be measured, the displacement amount of the object can be accurately measured with a simple structure consisting of one optical system.

Figure 8:
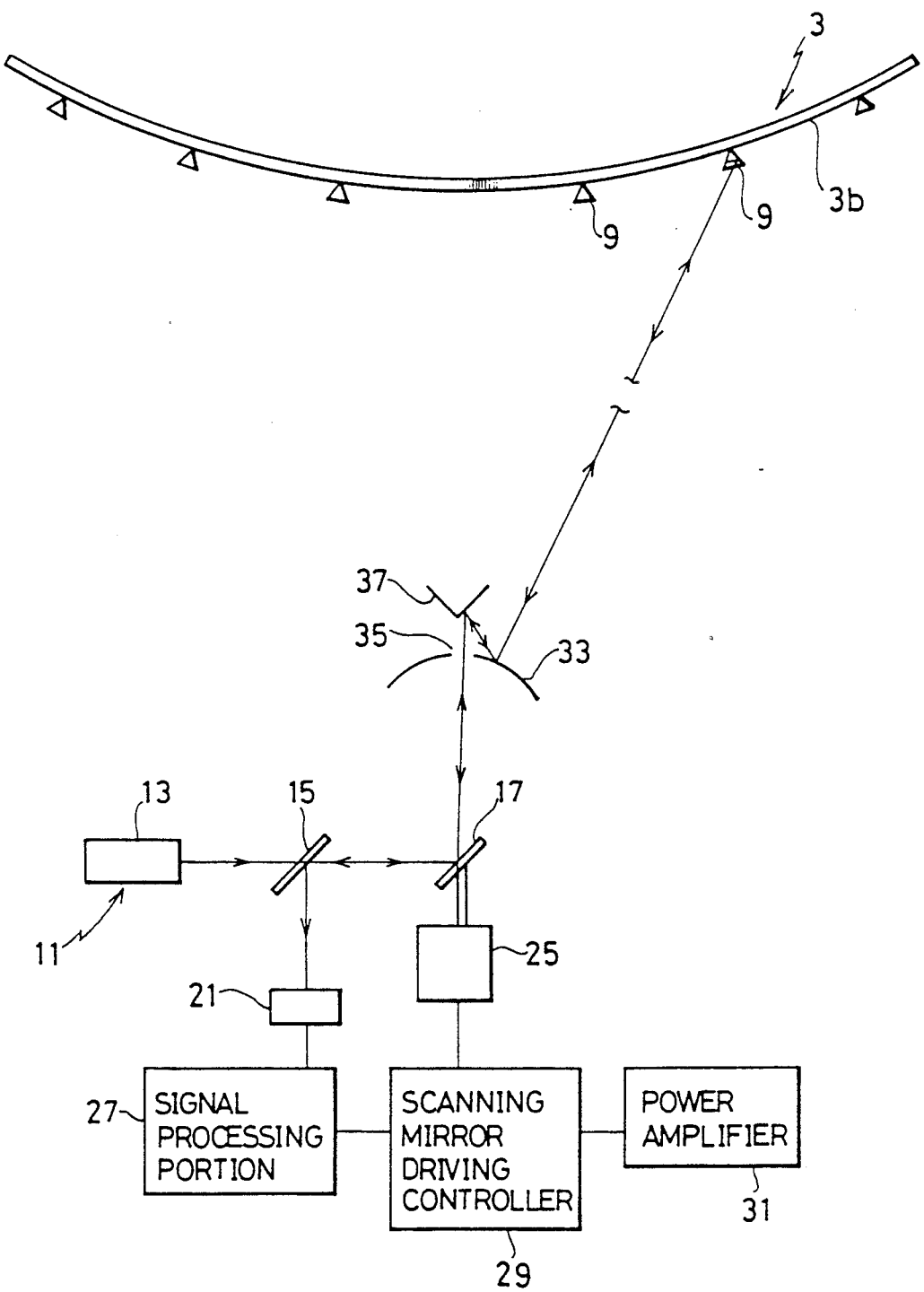
FIG. 8 is a general view showing a modification of the first embodiment shown in FIG. 5.

FIG. 8 is a view showing a modification of the first embodiment described in the above. In the figure, the same components as those of the first embodiment are represented by like numerals.

In this modification, the corner cube reflectors 9 as reflecting members are disposed on a back surface 3b of the main reflector 3. A plurality of reflector 33 having a variable reflecting direction is disposed on the back side of the main reflector 3. In the center of the reflector 33, thee is formed a through hole 35 for passing a light beam. A reflecting mirror 37 is disposed on one side of the reflector 33 at a position above, and corresponding to, the trough hole 35.

According to this arrangement, the displacement amount of the main reflector 3 can be measured without deteriorating the reflecting efficiency of the main reflector 3.

According to the first embodiment, the displacement amount of the main reflector 3 can be continuously measured several times within specific periods of time to note changes in the shape of the main reflector 3 so that any vibration state of the surface of the main reflector 3 can be determined.

As described in the above, according to the first embodiment, the deformation, etc., of a remote object can be measured accurately with a simple structure without having to provide a light source on the object to be measured. Further, with a simple structure of one optical system, the deformation amounts of many measuring points can be measured.

The second embodiment of the present invention will be described with reference to FIGS. 8 to 12.

Figure 9:
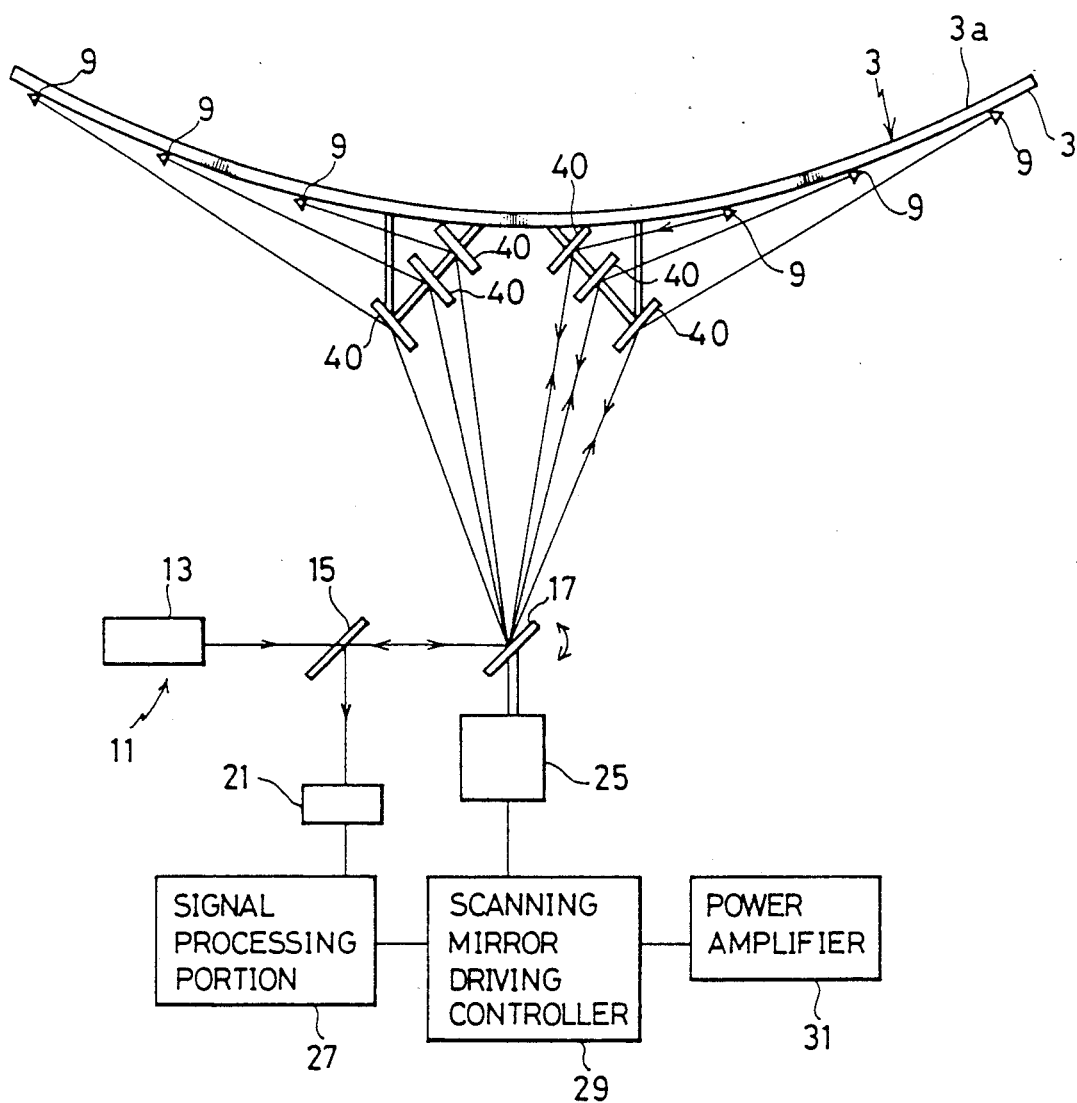
FIG. 9 is a general view showing a second embodiment of the displacement telemetering system according to the present invention.

FIG. 9 shows a space antenna adopting a displacement telemetering system according to the second embodiment of the present invention.

In the second embodiment, each of reflectors 40 is constituted such that a light beam from a scanning mirror 17 is made incident onto one corner cube reflector 9 substantially at right angles with respect to the normal of a surface 36 to be measured of a main reflector 3.

Another constitution of the second embodiment is substantially the same as that of the first embodiment In the second embodiment, the same elements as those of the first embodiment are represented by like numerals and explanations thereof will be omitted.

Figure 10:
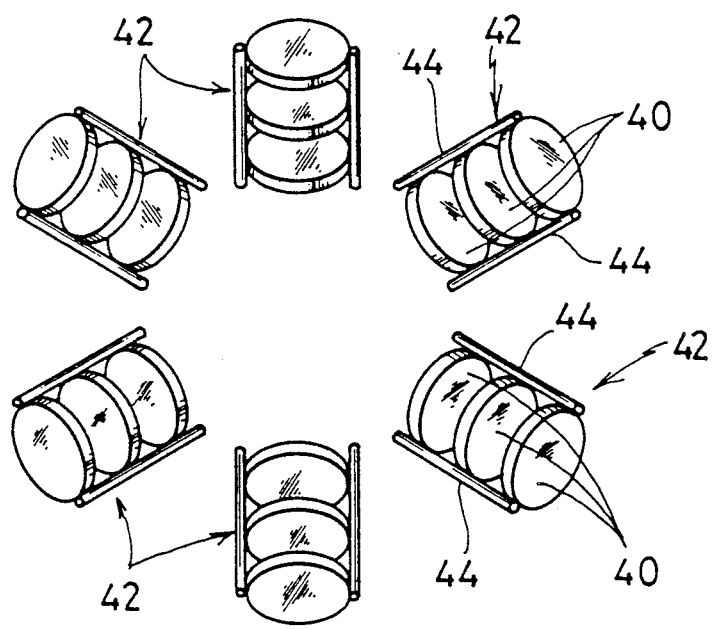
FIGS. 10 and 11 are front views showing assembled reflectors of the system shown in FIG. 8.
Figure 11:
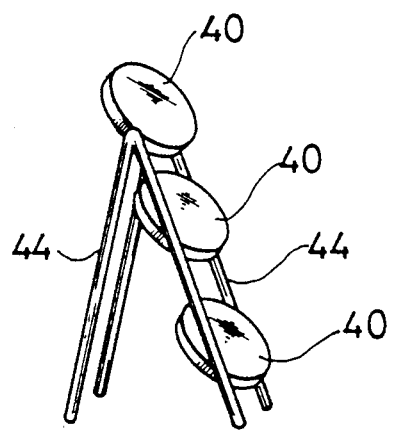

The reflectors 40 are fitted to a back surface 3b of the main reflector 3. As shown in FIG. 10, a plurality of the reflectors 40 make a set 42, and a plurality of the sets 42 are radially disposed at a central portion of the back surface 3b of the main reflector 3. The sets 42 are fixed to the back surface 3b of the main reflector 3 with supporting rods 44 as shown in FIG. 11. The reflectors 40 correspond to the corner cube reflectors 9 respectively. The positions and angles of the reflectors 40 are set such that a light beam from the scanning mirror 17 is reflected by one of the reflectors 40 and made incident onto a corresponding corner cube reflector 9 substantially at a right angles with respect to the normal of the surface 3b to be measured.

The operation of the second embodiment will be described.

A light beam emitted from a light source 13 passes through a half mirror 15 and is made incident onto the scanning mirror 17. The scanning mirror 17 is driven by a scanning mirror driving device 25 and positioned at a predetermined inclination angle so that the light beam made incident onto the scanning mirror 17 is reflected in a set direction and made incident onto one of the reflectors 40. The light beam made incident onto the reflector 40 is reflected by the reflector 40 and made incident onto a corresponding corner cube reflector 9 of a main reflector 3.

The light beam made incident onto the corner cube reflector 9 is reflected by the same in a direction anti-parallel to the incident light beam toward the reflector 40. The light beam is reflected by the reflector 40 and by the scanning mirror 17 and made incident onto the half mirror 15. The light beam is reflected by the half mirror 15 and made incident onto a two-dimensional optical position sensor 21. According to the signal detected by the two-dimensional optical position sensor 21, a signal processing portion 27 carries out an operating process to output the displacement amount of the main reflector 3.

Figure 12:
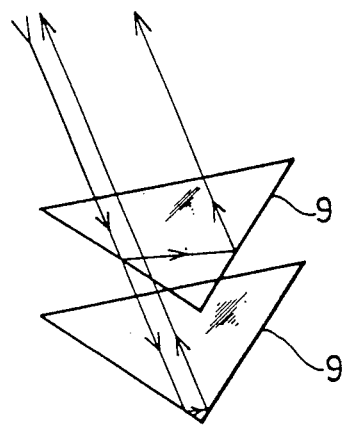
FIG. 12 is an explanatory view showing a reflecting state of a corner cube reflector of the system shown in FIG. 8.

The position of the light beam made incident onto the two-dimensional optical position sensor 21 changes depending on the position of the corner cube reflector 9. The scanning mirror 17 is adjusted to a particular inclination angle with respect to a particular corner cube reflector 9 by the scanning mirror driving device 25, which is driven and controlled by a scanning mirror driving controller 29, such that a light beam is made incident onto the corner cube reflector 9 at the same position and angle. Therefore, if the main reflector 3 is affected by heat strain, etc., that changes the position of the corner cube reflector 9 from an upper position to a lower position as shown in FIG. 12, the position of a reflected light beam detected by the two-dimensional optical position sensor 21 also changes.

Figure 13A:
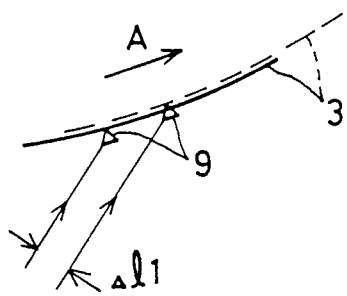
FIGS. 13(a) to 13(c) are explanatory views showing relations between the directions of light beams made incident to the corner cube reflector and the measurement of displacements in the system shown in FIG. 8.

If a light beam is made incident onto the corner cube reflector 9 not at right angles with respect to the normal of the surface 3b to be measured a shown in FIG. 13(a), a displacement amount Δl 1 will be measured even if the surface 3b is deformed along the arrow marked A. However, the deformation of the surface 3b along the arrow marked A does not largely affect the reflecting performance of the main reflector 3, so it is not necessary to measure such a deformation. Actually, it is rather preferable not to measure such a deformation along the arrow marked A because an output due to the deformation along the arrow marked A cannot be separated from the output due to a deformation in the direction normal to the surface to be measured, which has a large affect on the reflecting performance of the antenna and should therefore be measured.

Figure 13B:
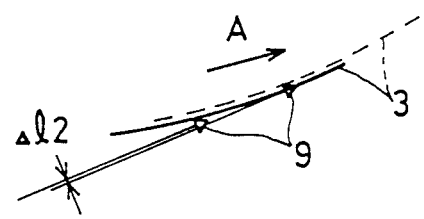
Figure 13C:
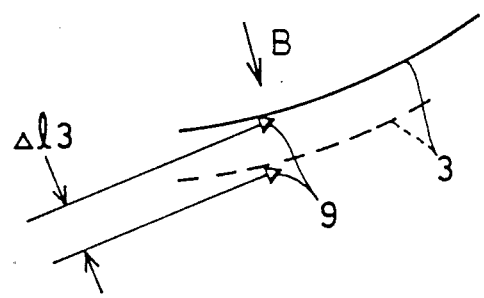

With the arrangement of the second embodiment, a light beam is made incident onto the surface 3b to be measured substantially at right angles with respect to the normal of the surface 3b as shown in FIGS. 13(b) and 13(c). As can be seen, the sensitivity with respect to a deformation (Δl 2), along the surface 3b is low as shown in FIG. 12(b), and the sensitivity with respect to a deformation (Δl 3) substantially orthogonal (the arrow marked B) to the normal of the surface to be measured is high, as shown in FIG. 12(c). Therefore, only the deformation substantially orthogonal to the normal of the surface 3b is measured. In the FIGS. 12(a) through 12(c), continuous lines indicate the shape of the main reflector 3 before deformation, and dotted lines represent the shape after deformation.

By changing the inclination angle of the scanning mirror 17, a light beam is made incident onto another corner cube reflector 9 to enable the measurement of a displacement amount of a different position of the main reflector 3.

In this way, the displacement amounts of the surface can be accurately measured with a simple structure of only one optical system without having to provide a light source on the surface to be measured.

As described in the above, according to the second embodiment of the present invention, the deformations, etc., of a remote object can be accurately measured with a simple structure without having to provide a light source on the object to be measured. Furthermore, the amount of deformation at a large number of measuring points can be determined with a simple structure of only one optical system. In addition, among the various displacement directions of a surface to be measured, the displacement only in the direction of the normal of the surface can be measured to improve measurement accuracy.

Various modifications are possible for the present disclosure without departing from the scope thereof

What is claimed is:

1. A displacement telemetering system for measuring displacements of an object, comprising:
   light emitting means for emitting a beam of light;
   scanning means for redirecting said beam into a redirected beam;
   first reflecting means for reflecting said redirected beam into a reflected beam;
   second reflecting means arranged on said object for reflecting said reflected beam into a first return beam, said first return beam being parallel to said reflected beam, said first return beam reflected by said first reflecting means into a second return beam, said second return beam being redirected by said scanning means into a third return beam;
   partial reflecting means for partially reflecting said third return beam into a final return beam;
   means for detecting said final return beam and for determining an incident position of said final return beam;
   a signal processing means for calculating a parallel displacement of said final return beam with respect to said incident position;
   controller means for driving said scanner means and for controlling the angle of said redirected beam with respect to a reference and for outputting the value of said angle.

2. The displacement telemetering system as claimed in claim 1, wherein the parallel displacement corresponds to said displacements of the object.

3. The displacement telemetering system as claimed in claim 2, further comprising:
   operating means for operating the displacement of the object according to said parallel displacement.

4. The displacement telemetering system as claimed in claim 3, wherein said second reflecting means comprises a plurality of reflecting members disposed at a plurality of measuring points respectively on said object and said first reflecting means comprises a plurality of reflectors having a variable reflecting direction to reflect said redirected beam toward one of said reflecting members.

5. The displacement telemetering system as claimed in claim 4, wherein the reflecting members disposed on the object comprise corner cube reflectors.

6. The displacement telemetering system as claimed in claim 4, wherein said means for detecting said final return beam comprises CCDs.

7. The displacement telemetering system as claimed in claim 4 wherein said operating means comprises a CPU, a ROM and a RAM.

8. The displacement telemetering system as claimed in claim 2, wherein said first reflecting means is constructed to reflect said redirected beam toward said second reflecting means substantially at right angles with respect to a normal of a surface at said object.

9. The displacement telemetering system as claimed in claim 8, wherein said second reflecting means comprises a plurality of reflecting members disposed at a plurality of measuring points respectively on said surface of said object, and said first reflecting means comprises a plurality of reflectors having a variable reflecting direction to reflect said redirected beam toward one of said reflecting members substantially at right angles with respect to said normal.

10. The displacement telemetering system as claimed in claim 1, wherein said scanning means comprises:
a reflecting direction variable reflector whose reflecting direction is variable.

11. A displacement telemetering system for measuring a displacement of an object comprising:
light emitting means for emitting a beam of light;
scanning means for redirecting said beam into a redirected beam;
first reflecting means for reflecting said redirected beam from said scanning means into a reflected beam;
second reflecting means arranged on said object for reflecting said reflected beam into a first return beam, said first return beam being antiparallel to said reflected beam, said first return beam reflected by said first reflecting means into a second return beam, said second return beam being redirected by said scanning means into a third return beam, said first reflecting means and said second reflecting means being arranged such that said reflected beam is made incident to said second reflecting means substantially at right angles with respect to a normal of a surface of said object;
partial reflecting means for partially reflecting said third return beam into a final return beam;
means for detecting said final return beam and for determining an incident position of said final return beam;
a signal processing means for calculating a parallel displacement of said final return beam with respect to said incident position; and
controller means for driving said scanner means and for controlling the angle of said redirected beam with respect to a reference and for outputting the value of said angle.

12. The displacement telemetering system as claimed in claim 11, wherein the parallel displacement of said final return beam corresponds to a displacement of the object to be measured.

13. The displacement telemetering system as claimed in claim 2, further comprising:
an operating means for operating the displacement of said object according to said parallel displacement.

14. The displacement telemetering system as claimed in claim 13, wherein said second reflecting means comprises a plurality of reflecting members disposed at a plurality of measuring points on a surface of said object, and said first reflecting means comprises a plurality of reflectors having a variable reflecting direction to reflect said redirected beam toward one of said reflecting members.

15. The displacement telemetering system as claimed in claim 11, wherein said scanning means comprises a reflecting direction variable reflector whose reflecting direction is variable.

16. A displacement telemetering system for measuring displacements of a plurality of retroreflectors which are fixed to various positions of a remote object, said system comprising:
a light emitting means for emitting a beam of light;
a partial reflector which is positioned so that light emitted from said light emitted means passes obliquely through said partial reflector;
a scanning mirror for reflecting the light passed through said partial reflector;
reflectors adapted to reflect the light reflected by said scanning mirror in order to redirect the light towards one of said retroreflectors in accordance with the position of said reflectors on which the light is incident;
a controller means for controlling the inclination of said scanning mirror in order to redirect at a predetermined angle the light passed through said partial reflector to any one of said retroreflectors after reflection upon said reflectors;
a means for receiving the light reflected by one of said retroreflectors, said reflectors, said scanning mirror and said half mirror and detecting an incident position of the light on said receiving means; and
a signal processor means for calculating the displacements of said retroreflectors on the basis of said incident position.

17. The system of claim 16 wherein said reflectors comprise light-reflecting surfaces which have diverse normals.

* * * * *

UNITED STATES PATENT AND TRADEMARK OFFICE
CERTIFICATE OF CORRECTION

PATENT NO. : 5,002,396

DATED : March 26, 1991

INVENTOR(S) : Tamane Ozawa

It is certified that error appears in the above-identified patent and that said Letters Patent is hereby corrected as shown below:

On the title page:

In Item 30, "Foreign Application Priority Data," insert the following additional prior Japanese application:

-- March 31, 1987 [JP] Japan ..... 62-78413 --.

Signed and Sealed this

Seventeenth Day of December, 1991

*Attest:*

HARRY F. MANBECK, JR.

*Attesting Officer*     *Commissioner of Patents and Trademarks*